US012558824B2

(12) United States Patent
Sugino et al.

(10) Patent No.: US 12,558,824 B2
(45) Date of Patent: Feb. 24, 2026

(54) MANAGEMENT SYSTEM AND MANAGEMENT METHOD

(71) Applicant: SINTOKOGIO, LTD., Nagoya (JP)

(72) Inventors: Takehiro Sugino, Nagoya (JP); Takashi Hanai, Nagoya (JP); Nobusato Kishi, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 451 days.

(21) Appl. No.: 17/988,914

(22) Filed: Nov. 17, 2022

(65) Prior Publication Data

US 2023/0166431 A1 Jun. 1, 2023

(30) Foreign Application Priority Data

Nov. 30, 2021 (JP) ................................. 2021-194268

(51) Int. Cl.
*B29C 43/58* (2006.01)

(52) U.S. Cl.
CPC ...... *B29C 43/58* (2013.01); *B29C 2043/5833* (2013.01)

(58) Field of Classification Search
CPC ............ B29C 43/58; B29C 2043/5833; B29C 33/3807; B29C 31/006; B29C 33/3842; G06K 17/0029; G06Q 50/04
See application file for complete search history.

(56) References Cited

U.S. PATENT DOCUMENTS

2011/0295404 A1    12/2011  Malinowski et al.
2018/0065329 A1*    3/2018  Oag ................. B29D 11/00067
2019/0077054 A1*    3/2019  Jessen .................... B33Y 30/00

2019/0247917 A1    8/2019  Nishida et al.
2021/0142468 A1    5/2021  Suzuki et al.
2021/0213522 A1    7/2021  Nishida et al.

FOREIGN PATENT DOCUMENTS

| CN | 110674155 A | 1/2020 |
| JP | H02-117769 A | 5/1990 |
| JP | 2004-334631 A | 11/2004 |
| JP | 2015-033712 A | 2/2015 |
| JP | 2019-164524 A | 9/2019 |
| JP | 2019-209343 A | 12/2019 |
| JP | 2021-077064 A | 5/2021 |
| JP | 2021-154316 A | 10/2021 |
| WO | 2017/085765 A1 | 5/2017 |

* cited by examiner

*Primary Examiner* — Charles R Kasenge
(74) *Attorney, Agent, or Firm* — Faegre Drinker Biddle & Reath LLP

(57) ABSTRACT

A management system includes: a tag given to structures including at least one of a pattern, a molding board, and a molding flask; a storage device; and a control device, wherein the control device is configured to store, in the storage device, collected data and management information being associated with each other, and when a predetermined condition is met in a case where the mold is transferred from a first position to a second position, associate the collected data with management information at the second position based on the information read from the tag, and the predetermined condition is met when the mold having been transferred to the first position along with the structure given the tag is not transferred to the second position along with the structure given the tag, or when the mold is combined with the structure given the tag at the second position.

9 Claims, 7 Drawing Sheets

MANAGEMENT SYSTEM AND MANAGEMENT METHOD

TECHNICAL FIELD

This disclosure relates to a management system and a management method.

CROSS-REFERENCE TO RELATED APPLICATION

This application claims the benefit of priority from Japanese Patent Application No. 2021-194268, filed on Nov. 30, 2021, the entire contents of which are incorporated herein by reference.

BACKGROUND

Japanese Unexamined Patent Publication No. 2015-33712 discloses a system that manages a manufacturing process of a casting. In this system, a sand mixing step, a sand filling step, a hardening step, a drawing step, a core setting step, and a mold assembling step are sequentially executed. In the drawing step, a molding serial number is given to each pair of a cope and a drag to be combined. The molding serial number is managed by being registered in a database. Meanwhile, manufacturing data on each sand mold having been acquired before the drawing step is registered in the database in connection with the molding serial number.

SUMMARY

For the manufacturing data on each sand mold and the molding serial number to correctly correspond to each other in the system described in Japanese Unexamined Patent Publication No. 2015-33712, sand molds need to be transferred in each step in the order of molding. In the molding step of molds, however, molds are not always transferred in the order of molding. This disclosure provides a technique that can appropriately manage collected data collected in a manufacturing process of a casting.

A management system according to one aspect of this disclosure includes a tag, a storage device, and a control device. The tag is given to structures including at least one of a pattern, a molding board, and a molding flask. The control device is communicably connected to the storage device. The control device is configured to acquire collected data collected in a manufacturing process of a casting, and store, in the storage device, the collected data and management information that is either information read from the tag or information issued for a mold, with the collected data and the management information being associated with each other. The control device is configured to, when a predetermined condition is met in a case where the mold is transferred from a first position to a second position, associate the collected data having been collected before the mold reaches the first position with management information at the second position based on the information read from the tag. The predetermined condition is met when the mold having been transferred to the first position along with the structure given the tag is not transferred to the second position along with the structure given the tag, or when the mold is combined with the structure given the tag at the second position.

In this management system, the tag is given to structures including at least one of the pattern, the molding board, and the molding flask. The collected data collected in the manufacturing process of a casting is stored by the control device in the storage device in association with the management information that is either the information read from the tag or the information issued for the mold. When the predetermined condition is met in the case where the mold is transferred from the first position to the second position, the collected data having been collected before the mold reaches the first position is associated with the management information at the second position based on the information read from the tag. The predetermined condition is met when the mold having been transferred to the first position along with the structure given the tag is not transferred to the second position along with the structure given the tag. In this case, the collected data associated with the information read from the tag is associated with either information read from a new tag given to the structure at the second position or information issued for a mold located at the second position. In addition, the predetermined condition is met when the mold is combined with the structure given the tag at the second position. In this case, the collected data associated with either the information read from the tag or the information issued for the mold located at the first position is associated with the information read from a new tag given to the structure at the second position. In this way, when the tag physically given to the structure is separated from the mold during transfer of the mold, or when the structure given the tag and the mold are combined, data can be carried over by means of the tag. Thus, the management system can make the mold and the collected data correctly correspond to each other even when molds are not transferred in the order of molding. Consequently, the management system can appropriately manage the collected data collected in the manufacturing process of a casting.

In one embodiment, the control device may be configured to update a relationship between the information issued for the mold and a transfer position as the mold is transferred. In this case, the management system can appropriately manage a relationship between a mold that is transferred with no tag given thereto and the transfer position.

In one embodiment, when the predetermined condition is met, the control device may associate management information at the first position and management information at the second position with each other based on the information read from the tag. In this case, by associating the pieces of management information with each other, the management system can associate the collected data having been collected before the mold reaches the first position with the management information at the second position.

In one embodiment, the mold may be molded by one of a self-hardening process, a thermosetting process, and a gas-hardening process. In a self-hardening process, a thermosetting process, and a gas-hardening process, molds are transferred in the order of having hardened to predetermined strength, so that the order of transfer thereof may differ from the order of molding. When a casting is manufactured by the aforementioned processes, the management system can appropriately manage the collected data collected in the manufacturing process of the casting.

A management method according to another aspect of this disclosure is a method that stores collected data collected in a manufacturing process of a casting and management information that is either information read from a tag given to structures including at least one of a pattern, a molding board, and a molding flask or information issued for a mold, with the collected data and the management information being associated with each other. The management method includes a step of, when a predetermined condition is met in a case where the mold is transferred from a first position to a second position, associating the collected data having been collected before the mold reaches the first position with management information at the second position based on the information read from the tag. The predetermined condition is met when the mold having been transferred to the first position along with the structure given the tag is not transferred to the second position along with the structure given the tag, or when the mold is combined with the structure given the tag at the second position.

The management method according to the other aspect of this disclosure offers the same advantages as the above-described management system.

According to various aspects and embodiments of this disclosure, collected data collected in a manufacturing process of a casting can be appropriately managed.

DETAILED DESCRIPTION

An illustrative embodiment of this disclosure will be described below with reference to the drawings. In the following description, the same or equivalent elements will be denoted by the same reference signs and an overlapping description will not be repeated.

[Configuration of Management System]

Figure 1:
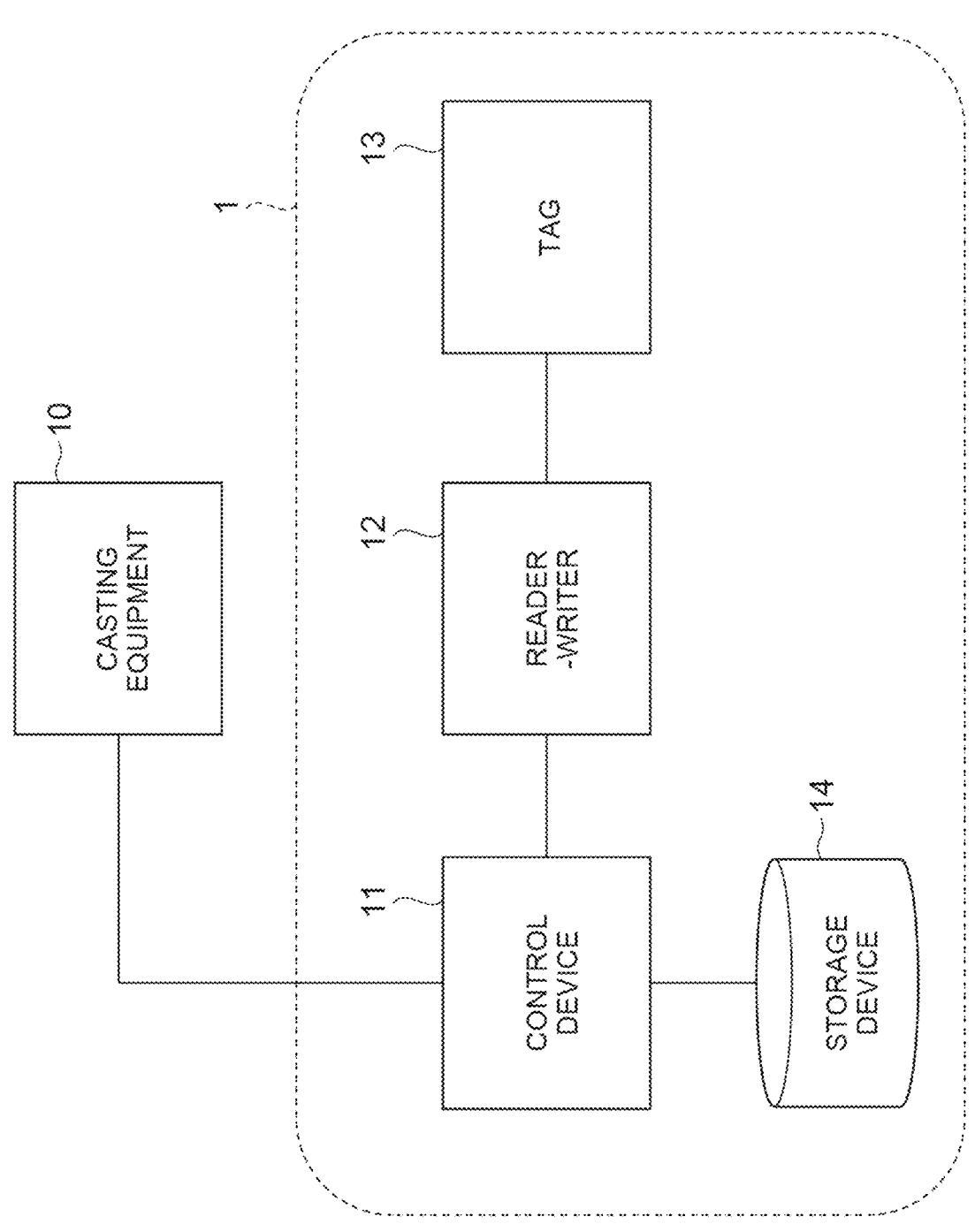
FIG. 1 is a block diagram showing the configuration of a management system according to an illustrative embodiment.

FIG. 1 is a block diagram showing the configuration of a management system according to an illustrative embodiment. A management system 1 shown in FIG. 1 is a system that manages information on casting equipment 10. The casting equipment 10 is equipment in which a manufacturing process of a casting is executed. The casting equipment 10 manufactures a mold (sand mold) by a manufacturing process that is one of a self-hardening process, a thermosetting process, and a gas-hardening process. In a self-hardening process, a thermosetting process, and a gas-hardening process, a mold is molded through a step of hardening mixed sand. In the following, as one example, the casting equipment 10 molds a mold by a self-hardening process. In the casting equipment 10, the steps are executed as the mold is transferred to positions corresponding to the respective steps. The casting equipment 10 includes constituent elements such as control equipment, a sand mixer, a transfer device, various sensors, and a mold strength measurement device, and is configured to measure and collect data in the manufacturing process of a casting.

The management system 1 includes a control device 11. The control device 11 is communicably connected to constituent elements of the casting equipment 10 and configured to be able to acquire collected data collected in the manufacturing process of a casting. As one example, the control device 11 is a programmable logic controller (PLC) that can communicate with the casting equipment 10. The control device 11 may be configured as a common computer system including a central processing unit (CPU), a main storage device such as a random-access memory (RAM) or a read-only memory (ROM), an input device such as a touch panel or a keyboard, an output device such as a display, and an auxiliary storage device such as a hard disc. The control device 11 may be a PLC that can control constituent elements of the casting equipment 10, or may be provided separately from a PLC that can control constituent elements of the casting equipment 10.

A tag 13 is given to structures including at least one of a pattern, a molding board, and a molding flask. The structures may include only the pattern, may include only the molding board, or may include only the molding flask. The structures may include the pattern and molding board, may include the pattern and the molding flask, or may include the molding board and the molding flask. The structures may include the pattern, the molding board, and the molding flask. The tag 13 is physically attached to the structures. The tag 13 is, as one example, a radio frequency identification (RFID) tag. The control device 11 acquires information read from the tag 13 through a reader-writer 12. The information read from the tag 13 is, as one example, identification information for identifying the tag 13. The identification information consists of letters, numbers, symbols, etc. One example of the identification information is a tag number stored in an RFID tag. The tag 13 may be a one-dimensional code, a two-dimensional code, a paper slip, an impressed identifier, etc. In this case, the management system 1 can include a reader instead of the reader-writer 12.

The control device 11 is communicably connected to a storage device 14. The control device 11 stores the collected data and the information read from the tag 13 (one example of management information) in association with each other in the storage device 14. Associating means making one piece of information specifiable from the other piece of information and vice versa. The control device 11 stores the tag number and the collected data in association with each other in the storage device 14.

The control device 11 can also store the collected data and information issued for a mold (one example of the management information) in association with each other in the storage device 14. The information issued for the mold is identification information for identifying the mold. The identification information consists of letters, numbers, symbols, etc. One example of the identification information is a shift number. For example, the shift number is issued for each production of a mold by the casting equipment 10. The shift number is made to correspond to a transfer position of a mold on a one-to-one basis. Therefore, the control device 11 updates the relationship between the shift number and the transfer position as the mold is transferred. In a step in which the mold is not transferred along with the structure given the tag 13, the control device 11 stores the shift number and the collected data in association with each other in the storage device 14.

The control device 11 is configured to, when a predetermined condition is met in a case where the mold is transferred from a first position to a second position, associate the collected data having been collected before the mold reaches the first position with management information at the second position based on the information read from the tag 13. The predetermined condition is met when the mold having been transferred to the first position along with the structure given the tag 13 is not transferred to the second position along with the structure given the tag 13.

For example, when the tag 13 is given to the pattern, the predetermined condition is met in the drawing step in which the pattern and the mold are separated from each other. The collected data having been collected before the mold reaches the first position is acquired with reference to the storage device 14 based on the tag number read from the tag 13. The separated mold is disposed on the molding board or a transfer device given a new tag at the second position. The transfer device is, for example, a conveyor or a traverser.

In the case where the separated mold is disposed on the molding board given a new tag at the second position, the control device 11 associates the collected data having been collected before the mold reaches the first position with the tag number read from the new tag (one example of the management information at the second position). In the case where the separated mold is disposed on the transfer device at the second position, the control device 11 associates the collected data having been collected before the mold reaches the first position with the shift number issued for the mold at the second position (one example of the management information at the second position). The shift number may be issued for each action of one mold moving over for another. Thus, also when the mold having been transferred to the first position along with the structure given the tag 13 is not transferred to the second position along with the structure given the tag 13, the control device 11 can carry over the collected data having been collected before the mold reaches the first position to the management information at the second position.

When the tag 13 is given to the molding board, the predetermined condition is met when the mold moves onto another molding board or the transfer device. When the tag 13 is given to the molding flask, the predetermined condition is met when the molding flask and the mold are separated from each other. Also when the tag 13 is given to the molding board or the molding flask, the control device 11 can carry over the collected data having been collected before the mold reaches the first position to the management information at the second position by performing the same processing as when the tag 13 is given to the pattern.

The predetermined condition is further met when the mold is combined with the structure given the tag at the second position. For example, for the mold for which the tag 13 is given to none of the pattern, the molding board, and the molding flask, the collected data is managed by the shift number. Such a mold is transferred by, for example, the transfer device. When the mold on the transfer device moves onto the molding board given the tag, the predetermined condition is met. The control device 11 manages the collected data having been collected before the mold reaches the first position by the shift number. The control device 11 associates the collected data managed by the shift number with the tag number read from the tag at the second position (one example of the management information at the second position). More specifically, the control device 11 reads the tag number from the tag at the second position, and regards the read tag number as the tag number to be associated with the collected data managed by the shift number, and associates this tag number and the collected data with each other. Thus, the control device 11 realizes association based on the tag number.

When the tag 13 is an RFID tag, the storage device 14 may be included in the tag 13. In this case, the control device 11 writes information into the RFID tag through the reader-writer 12. The control device 11 associates the tag number and the collected data with each other by writing information into the RFID tag. The control device 11 may associate the tag number and the shift number with each other by writing information into the RFID tag.

[Manufacturing Process and Data Management Method]

Figure 2:
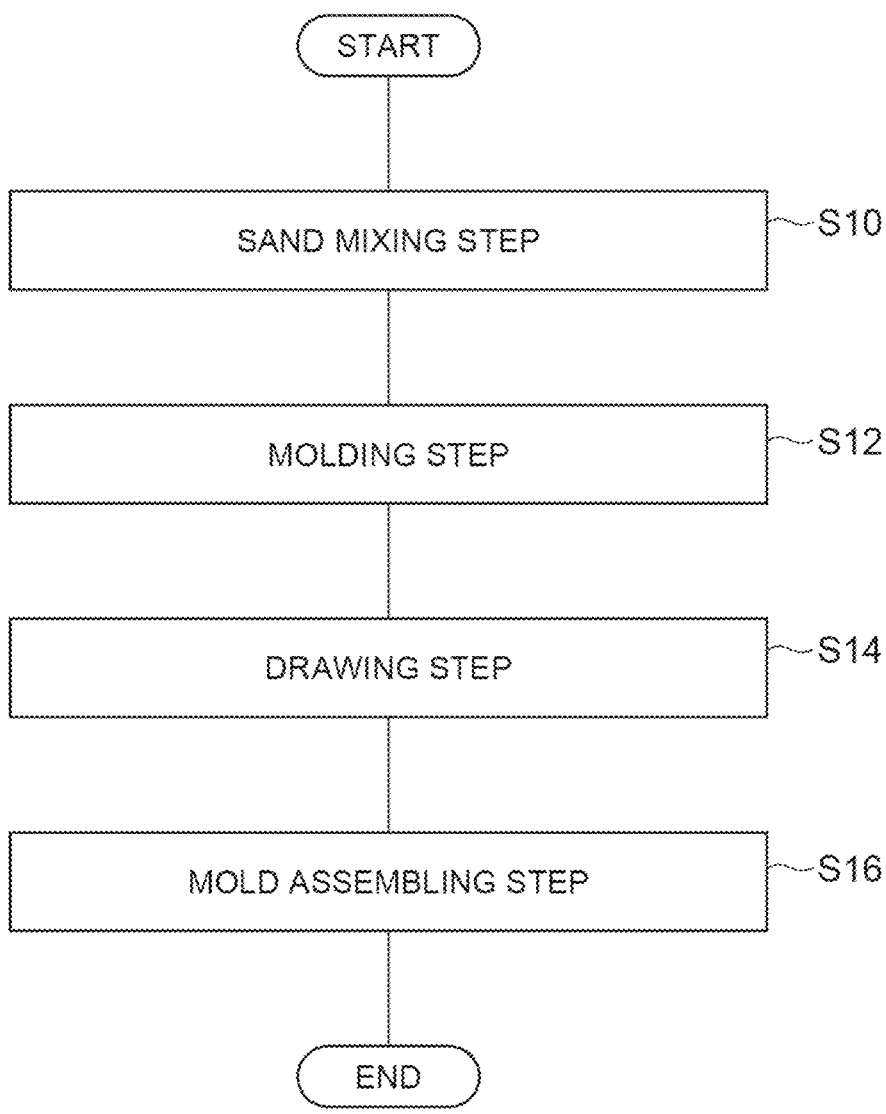
FIG. 2 is a flowchart showing a manufacturing process.

Next, details of the casting step executed in the casting equipment 10, collected data collected in each step, and a data management method will be described. In the following description, as one example, the tag 13 given to structures is an RFID tag. The control device 11 controls constituent elements of the casting equipment 10. FIG. 2 is a flowchart showing the manufacturing process. The manufacturing process includes steps performed to manufacture a casting, more specifically, for example, a sand regeneration step, a sand transport step, a sand mixing step, a molding step, a mold coating step, a drawing step, a core setting step, a transfer step, a hardening step, a mold assembling step, a molten metal pouring step, a cooling step, a post-processing step, and an inspection step.

As shown in FIG. 2, first, the sand mixing step (step S10) is executed. In the sand mixing step (step S10), the control device 11 reads an RFID tag attached to the pattern by the reader-writer 12 to acquire the tag number. The control device 11 has the tag number and sand mixing conditions stored beforehand in association with each other in the storage device 14. With reference to the storage device 14, the control device 11 acquires the sand mixing conditions associated with the acquired tag number. Examples of the sand mixing conditions include a sand mixing time, an amount of additive to be added, and a sand mixing weight. For the later molding step, the control device 11 may acquire molding conditions along with the sand mixing conditions based on the acquired tag number. The molding conditions are a molding time, an amount of sand to be charged, a vibration time, worker information, etc. The sand mixing conditions and the molding conditions may be directly written into the RFID tag.

Figure 3:
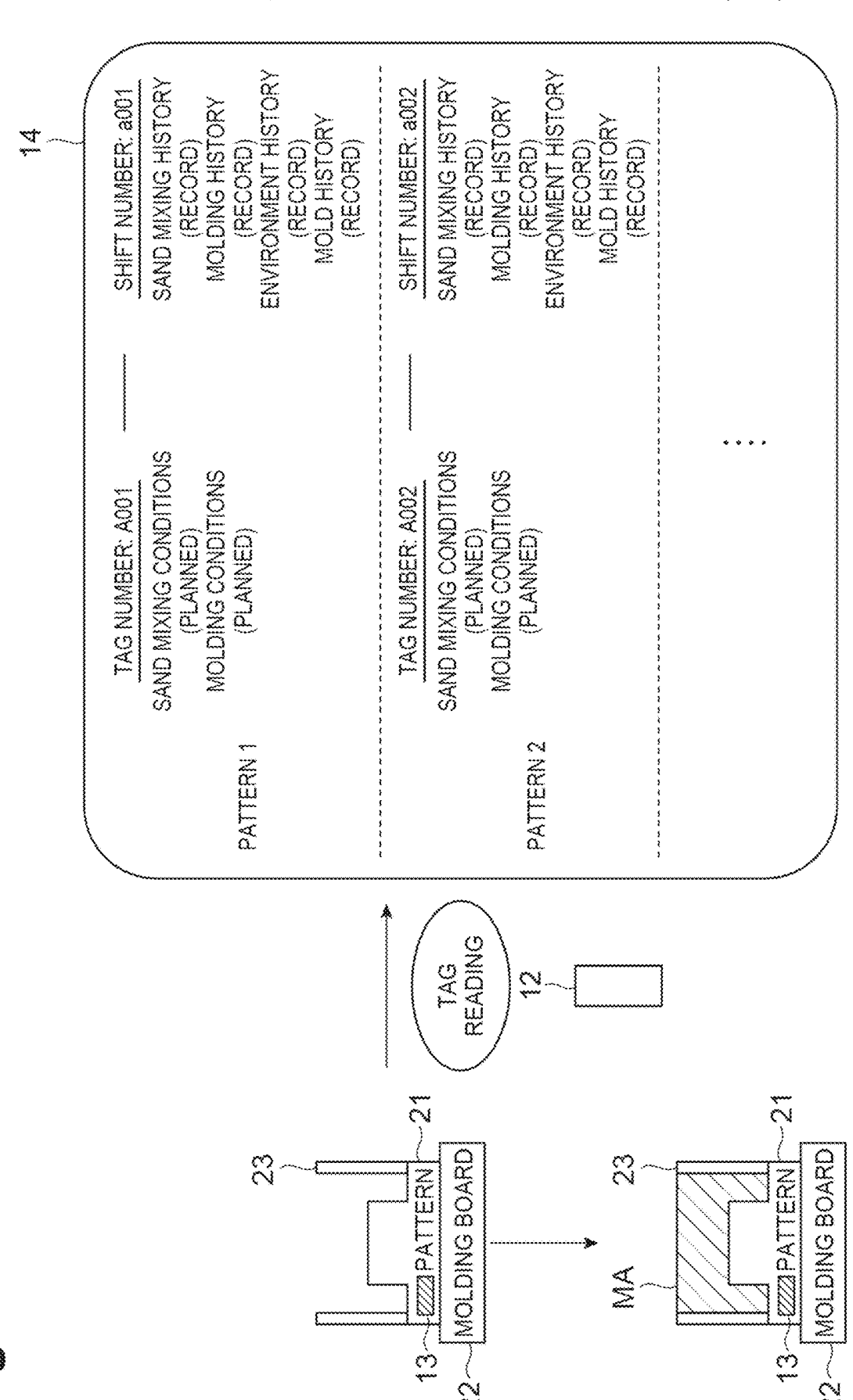
FIG. 3 is a view illustrating operation from a sand mixing step to a molding step.

In the following, details of the sand mixing step (step S10) will be described. FIG. 3 is a view illustrating operation from the sand mixing step to the molding step. In the example shown in FIG. 3, the tag 13 is given to a pattern 21. The control device 11 reads the tag 13 to acquire a tag number A001. Then, the control device 11 acquires the sand mixing conditions and the molding conditions associated with the tag number A001. The control device 11 operates the sand mixer based on the sand mixing conditions. The sand mixer performs sand mixing operation based on the received sand mixing conditions. The sand mixer starts the sand mixing operation upon the pattern 21, a molding board 22, and a molding flask 23 having moved to a sand filling position of the sand mixer. The sand mixer acquires a sand mixing history based on detection results of sensors. The sand mixing history is, for example, a record of a sand mixing time, an amount of additive added, a sand mixing weight, etc., and is one example of the collected data. The control device 11 acquires the sand mixing history from the casting equipment 10. The mixed sand is supplied to the molding flask 23. The casting equipment 10 (e.g., the sand mixer) issues a shift number a001.

The control device 11 stores the read tag number A001 and the sand mixing history in association with each other in the storage device 14. Specifically, the control device 11 acquires the shift number a001 from the casting equipment 10. Then, the control device 11 stores, in the storage device 14, the tag number A001 and the shift number a001 in association with each other and the shift number a001 and the sand mixing history in association with each other. The control device 11 moves the pattern 21, the molding board 22, and the molding flask 23 to the sand filling position of the sand mixer and, upon each movement, updates the relationship between the shift number a001 and a transfer position (transfer address).

When the sand mixing step (step S10) ends, the molding step (step S12) is executed. In the molding step (step S12), the control device 11 starts molding based on the molding conditions associated with the tag number that have been acquired in the sand mixing step (step S10). When the molding conditions have not been acquired in the sand mixing step (step S10), the control device 11 acquires the molding conditions at this timing. At a molding place, a molding history is acquired based on detection results of sensors. The molding history is, for example, a record of a molding time, an amount of sand charged, a vibration time, worker information, etc., and is one example of the collected data. The control device 11 acquires the molding history from the casting equipment 10. Then, as shown in FIG. 3, the control device 11 stores the read tag number A001 and the molding history in association with each other in the storage device 14. Specifically, the control device 11 stores the shift number a001 and the molding history in association with each other in the storage device 14. Thus, the molding history is associated with the tag number A001.

In the sand mixing step (step S10) and the molding step (step S12), the control device 11 may acquire an environment history and associate it with the tag number A001. The environment history is, for example, a temperature, a humidity, a sand temperature, etc. detected by sensors, and is one example of the collected data. As shown in FIG. 3, the control device 11 stores the shift number a001 and the environment history in association with each other in the storage device 14. Thus, the environment history is associated with the tag number A001.

The control device 11 may include a measurement step after the end of the molding step (step S12). In the measurement step, a mold history is acquired as one example of the collected data. The mold history is a hardening time, mold strength (compressive strength) measurement data, etc. The hardening time is a time from completion of the molding step until the drawing step is started. The mold strength measurement data is measured by a device such as a mold strength measurement device that measures strength by inserting a measurement needle into a surface of a mold. As shown in FIG. 3, the control device 11 stores the shift number a001 and the mold history in association with each other in the storage device 14. Thus, the mold history is associated with the tag number A001.

The control device 11 may execute the sand mixing step (step S10) and the molding step (step S12) for each pattern. For example, as shown in FIG. 3, in the storage device 14, the collected data may be allotted to the tag number and the shift number on a pattern-by-pattern basis.

Subsequently, the drawing step (step S14) is executed. The control device 11 operates a drawing device to remove a mold MA from the pattern 21 or from the pattern 21 and the molding flask 23. In the case of molding with a flask, the mold after drawing is a mold with a flask, and in the case of flaskless molding, the mold after drawing is a mold with the flask removed. In the drawing step (step S14), for example, the mold MA after drawing moves onto a molding board for transfer. Thus, the mold MA is transferred from a predetermined position in the drawing step (one example of the first position) onto the molding board for transfer (one example of the second position). Here, the mold MA having been transferred to the predetermined position in the drawing step along with the pattern 21 given the tag 13 is not transferred onto the molding board for transfer or the conveyor along with the pattern 21 given the tag 13 (one example of the case where the predetermined condition is met). Therefore, based on the information read from the tag 13, the control device 11 associates the collected data having been collected before the mold MA reaches the predetermined position in the drawing step with the tag number read from a new tag given to the molding board for transfer.

Figure 4:
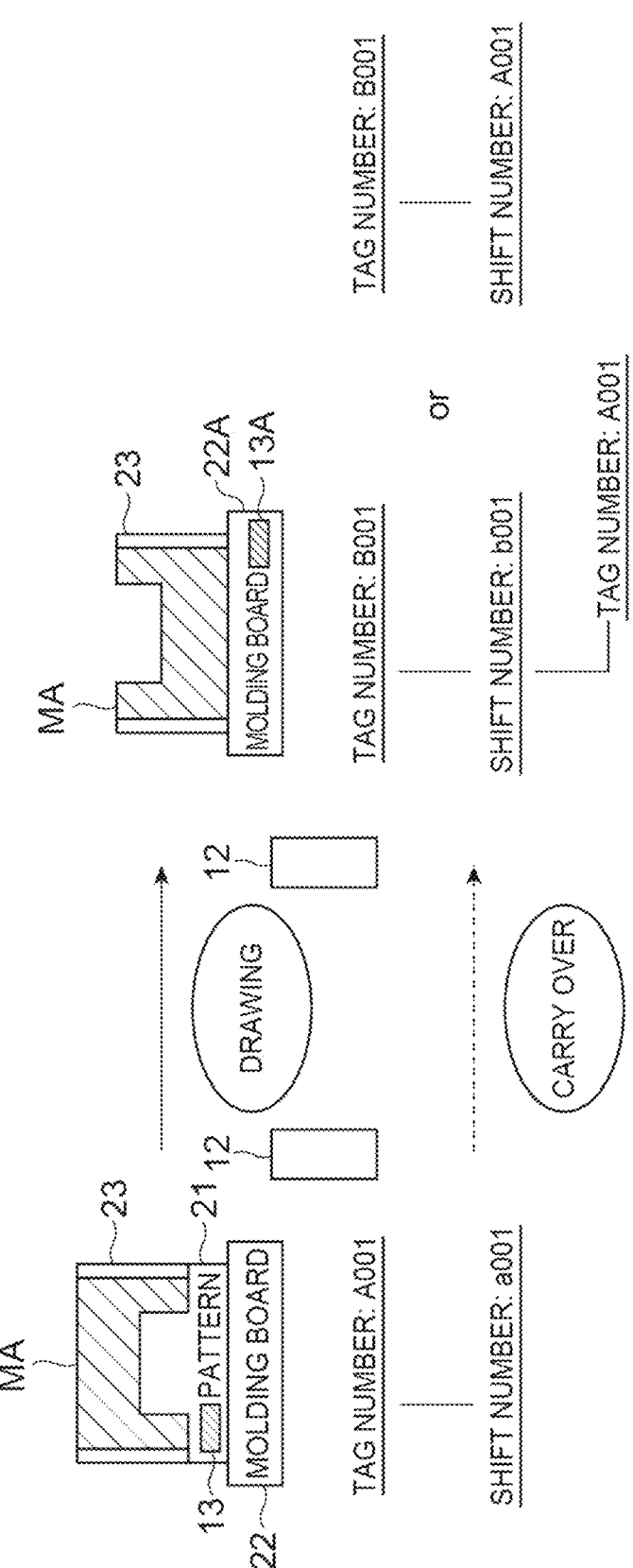
FIG. 4 is a view illustrating operation in a drawing step.

FIG. 4 is a view illustrating operation in the drawing step. As shown in FIG. 4, the mold MA after drawing moves onto a molding board for transfer 22A. Based on the information read from the tag 13, the control device 11 associates the collected data having been collected before the mold MA reaches the predetermined position in the drawing step with a tag number B001 read from a new tag 13A given to the molding board for transfer 22A. Specifically, the control device 11 associates the tag number A001 at the predetermined position in the drawing step and the tag number B001 of the molding board for transfer 22A with each other. The control device 11 may associate the tag number A001 and the tag number B001 with each other through a shift number b001 that is given at the time of move onto the molding board for transfer 22A. The control device 11 may associate the tag number A001 and the shift number a001 associated with the tag number A001 with the tag number B001 and the shift number b001.

In the drawing step (step S14), for example, the mold MA after drawing may move onto a transfer device such as a conveyor. Thus, the mold MA is transferred from the predetermined position in the drawing step (one example of the first position) onto the transfer device (one example of the second position). Here, the mold MA having been transferred to the predetermined position in the drawing step along with the pattern 21 given the tag 13 is not transferred to the transfer device along with the pattern 21 given the tag 13 (one example of the case where the predetermined condition is met). Therefore, based on the information read from the tag 13, the control device 11 associates the collected data having been collected before the mold MA reaches the predetermined position in the drawing step with the shift number given to the mold. Thus, the collected data is carried over to later steps.

Figure 5:
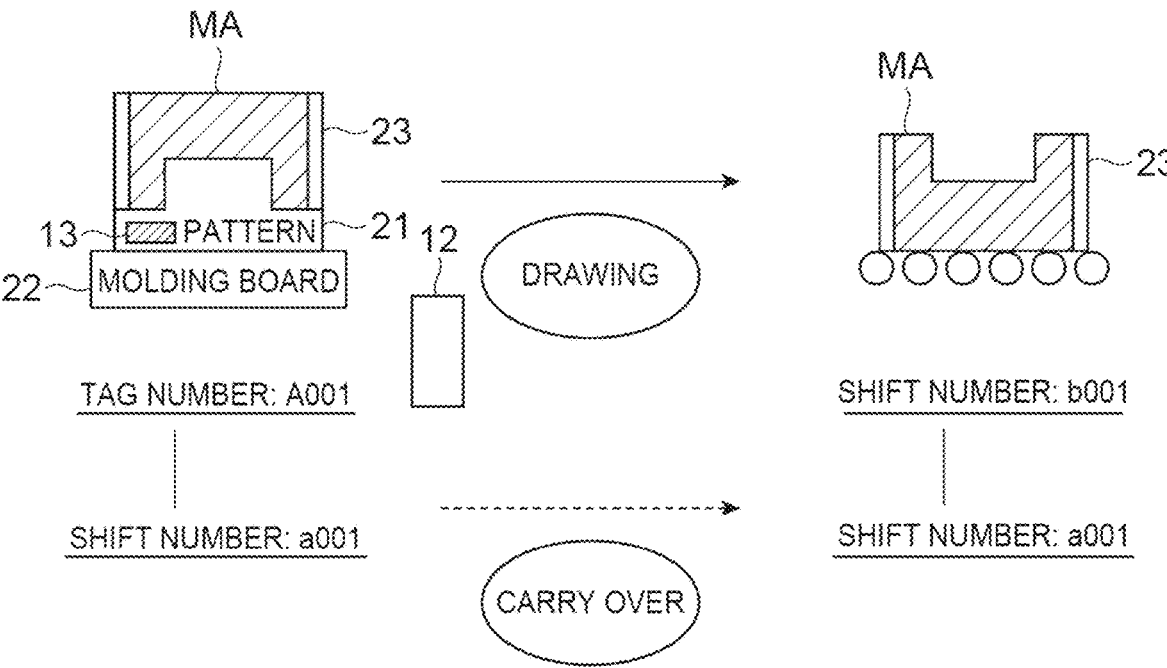
FIG. 5 is a view illustrating another operation in the drawing step.

FIG. 5 is a view showing another operation in the drawing step. As shown in FIG. 5, the mold MA after drawing moves onto the transfer device. Based on the information read from the tag 13, the control device 11 associates the collected data having been collected before the mold MA reaches the predetermined position in the drawing step with the shift number b001 at a transfer destination. Specifically, the control device 11 associates the tag number A001 at the predetermined position in the drawing step and the shift number b001 at the transfer destination with each other. The control device 11 associates the shift number b001 with the shift number a001. Thus, the collected data is carried over to later steps. The control device 11 may associate the shift number b001 with the tag number A001 and further associate it with the shift number a001.

Subsequently, the mold assembling step (step S16) is executed. In the mold assembling step, the control device 11 makes a mold assembling device assemble the cope and drag. For example, the control device 11 moves the cope and drag onto a molding board for pouring molten metal. Specifically, a cope is transferred from a predetermined position in the mold assembling step (one example of the first position) onto the molding board for pouring molten metal (one example of the second position). Then, a drag is transferred from the predetermined position in the mold assembling step (one example of the first position) onto the molding board for pouring molten metal (one example of the second position). In this case, the cope and drag having been transferred to the predetermined position in the mold assembling step along with the molding board given the tag are not transferred onto the molding board for pouring molten metal or the conveyor along with the molding board given the tag (one example of the case where the predetermined condition is met). Therefore, based on the information read from the tag 13, the control device 11 associates the collected data having been collected before the cope and drag reach the predetermined position in the drawing step with the tag number read from a new tag given to the molding board for pouring molten metal.

Figure 6:
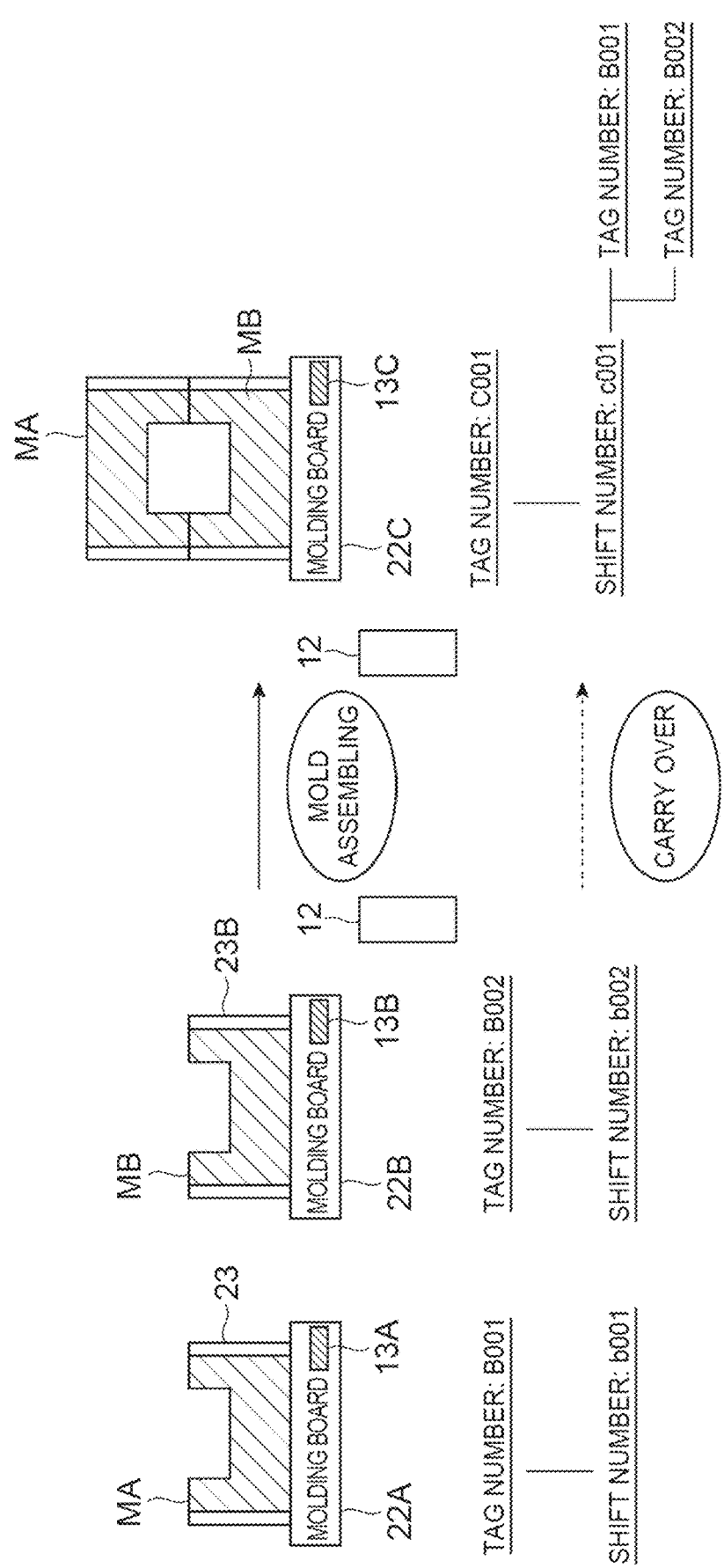
FIG. 6 is a view illustrating operation in a mold assembly step.

FIG. 6 is a view illustrating operation in the mold assembling step. As shown in FIG. 6, the mold MA (cope) after drawing moves from the molding board for transfer 22A onto a molding board for pouring molten metal 22C. A mold MB (drag) after drawing moves from a molding board for transfer 22B onto the molding board for pouring molten metal 22C. Based on the information read from the tag 13A, the control device 11 associates the collected data having been collected before the mold MA reaches the predetermined position in the mold assembling step with a tag number C001 read from a new tag 13C given to the molding board for pouring molten metal 22C. Specifically, the control device 11 associates the tag number B001 at the predetermined position in the mold assembling step and the tag number C001 of the molding board for pouring molten metal 22C with each other. Similarly, based on the information read from a tag 13B, the control device 11 associates the collected data having been collected before the mold MB reaches the predetermined position in the mold assembling step with the tag number C001 read from the new tag 13C given to the molding board for pouring molten metal 22C. Specifically, the control device 11 associates a tag number B002 at the predetermined position in the mold assembling step with the tag number C001 of the molding board for pouring molten metal 22C. The control device 11 may associate the tag number B001 and the tag number B002 with the tag number C001 through a shift number c001 that is given at the time of move onto the molding board for pouring molten metal 22C.

In the mold assembling step (step S16), the cope and drag having been transferred on the transfer device may be assembled on the molding board for pouring molten metal 22C. In this case, on the molding board for pouring molten metal 22C (one example of the second position), the cope and drag are combined with the molding board for pouring molten metal 22C given the tag (one example of the case where the predetermined condition is met). Therefore, based on the information read from the tag, the control device 11 associates the collected data having been collected before the cope and drag reach the predetermined position in the mold assembling step with the tag number read from the tag of the molding board for pouring molten metal 22C. Thus, the collected data is carried over to later steps.

Figure 7:
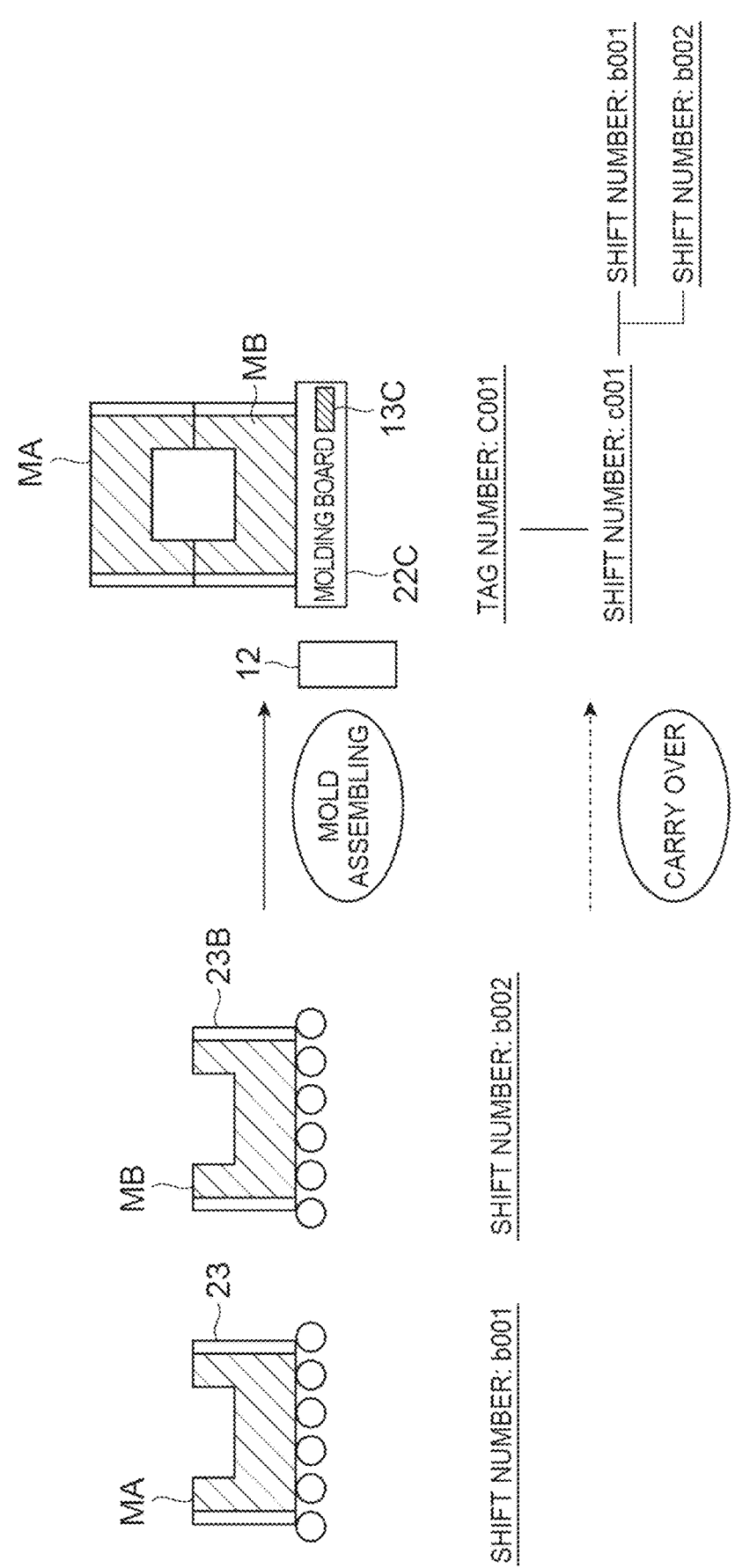
FIG. 7 is a view illustrating another operation in the mold assembly step.

FIG. 7 is a view illustrating another operation in the mold assembling step. As shown in FIG. 7, the mold MA (upper mold) and the mold MB (lower mold) after drawing are transferred by the transfer device and arrive at the predetermined position in the mold assembling step. Based on the information read from the shift number b001, the control device 11 associates the collected data having been collected before the mold MA reaches the predetermined position in the mold assembling step with the tag number C001 read from the tag 13C given to the molding board for pouring molten metal 22C that is the transfer destination. Specifically, the control device 11 associates the shift number b001 at the predetermined position in the mold assembling step and the tag number C001 at the transfer destination with each other. Similarly, based on the information read from the shift number b002, the control device 11 associates the collected data having been collected before the mold MB reaches the predetermined position in the mold assembling step with the tag number C001 read from the tag 13C given to the molding board for pouring molten metal 22C that is the transfer destination. Specifically, the control device 11 associates the shift number b002 at the predetermined position in the mold assembling step and the tag number C001 at the transfer destination with each other. The control device 11 may associate the shift number b001 and the shift number b002 with the tag number C001 through the shift number c001 that is given at the time of move onto the molding board for pouring molten metal 22C.

When the mold assembling step (step S16) ends, the flowchart shown in FIG. 2 ends. After the flowchart shown in FIG. 2 ends, the molten metal pouring step, the cooling step, the post-processing step, and the inspection step follow to complete a casting.

Summary of Embodiment

In the management system 1, the tag 13 is given to structures including at least one of the pattern 21, the molding board 22, and the molding flask 23. The collected data collected in the manufacturing process of a casting is stored by the control device 11 in the storage device 14 in association with the management information that is either the tag number read from the tag 13 or the shift number issued for the mold MA. When the predetermined condition is met in the case where the mold MA is transferred from the first position to the second position, the collected data having been collected before the mold MA reaches the first position is associated with the management information at the second position based on the information read from the tag 13. The predetermined condition is met when the mold MA having been transferred to the first position along with the structure given the tag 13 is not transferred to the second position along with the structure given the tag 13. In this case, the collected data associated with the information read from the tag 13 is associated with either the tag number read from the new tag 13 given to the structure at the second position or the shift number issued for the mold MA located at the second position. In addition, the predetermined condition is met when the mold MA is combined with the structure given the tag 13 at the second position. In this case, the collected data associated with either the tag number read from the tag 13 or the shift number issued for the mold MA located at the first position is associated with the tag number read from the new tag 13 given to the structure at the second position. In this way, when the tag 13 physically given to the structure is separated from the mold MB during transfer of the mold MB, or when the structure given the tag 13 is combined with the mold MB, the data can be carried over by means of the tag 13. Thus, the management system 1 can make the mold MB and the collected data correctly correspond to each other even when the molds MB are not transferred in the order of molding. Consequently, the management system 1 can appropriately manage the collected data collected in the manufacturing process of a casting.

While an illustrative embodiment has been described above, this disclosure is not limited to the above illustrative embodiment, and various omissions, substitutions, and changes may be made. For example, in the above embodiment, the example has been shown in which the control device 11 associates the tag number of an RFID tag and the shift number with each other and the collected data is carried over at the time when the mold moves onto the molding board, but the collected data may instead be directly written into the RFID tag. In this case, in the sand mixing step and the molding step, the control device 11 directly writes the information into the RFID tag. In the drawing step, the control device 11 carries over the directly written information to another RFID tag or a shift number. In the mold assembling step, the control device 11 carries over the information carried over from the drawing step to another RFID. In this way, the collected data may be carried over to later steps.

REFERENCE SIGNS LIST

1 . . . Management system, 10 . . . Casting equipment, 11 . . . Control device, 13, 13A, 13B, 13C . . . Tag.

What is claimed is:

1. A management system comprising:
a tag configured to give to structures including at least one of a pattern, a molding board, and a molding flask;
a storage device; and
a control device communicably connected to the storage device,
wherein the control device is configured to:
    acquire collected data collected in a manufacturing process of a casting;
    store, in the storage device, the collected data and management information that is either information read from the tag or information issued for a mold, with the collected data and the management information being associated with each other; and
    when a predetermined condition is met in a case where the mold is transferred from a first position to a second position, associate the collected data having been collected before the mold reaches the first position with management information at the second position based on the information read from the tag, and
  wherein the predetermined condition is met when the mold having been transferred to the first position along with the structure given the tag is not transferred to the second position along with the structure given the tag, or when the mold is combined with the structure given the tag at the second position.

2. The management system according to claim 1, wherein the control device is configured to update a relationship between the information issued for the mold and a transfer position as the mold is transferred.

3. The management system according to claim 1, wherein, when the predetermined condition is met, the control device associates management information at the first position and management information at the second position with each other based on the information read from the tag.

4. The management system according to claim 2, wherein, when the predetermined condition is met, the control device associates management information at the first position and management information at the second position with each other based on the information read from the tag.

5. The management system according to claim 1, wherein the mold is molded by one of a self-hardening process, a thermosetting process, and a gas-hardening process.

6. The management system according to claim 2, wherein the mold is molded by one of a self-hardening process, a thermosetting process, and a gas-hardening process.

7. The management system according to claim 3, wherein the mold is molded by one of a self-hardening process, a thermosetting process, and a gas-hardening process.

8. The management system according to claim 4, wherein the mold is molded by one of a self-hardening process, a thermosetting process, and a gas-hardening process.

9. A management method that stores collected data collected in a manufacturing process of a casting and management information that is either information read from a tag given to structures including at least one of a pattern, a molding board, and a molding flask or information issued for a mold, with the collected data and the management information being associated with each other,
  the management method comprising a step of, when a predetermined condition is met in a case where the mold is transferred from a first position to a second position, associating the collected data having been collected before the mold reaches the first position with management information at the second position based on the information read from the tag,
  wherein the predetermined condition is met when the mold having been transferred to the first position along with the structure given the tag is not transferred to the second position along with the structure given the tag, or when the mold is combined with the structure given the tag at the second position.

\* \* \* \* \*